United States Patent
Riehl et al.

(10) Patent No.: US 10,839,241 B2
(45) Date of Patent: Nov. 17, 2020

(54) DEVICE FOR THE DIRECT OPTICAL RECORDING OF SKIN PRINTS

(71) Applicant: JENETRIC GmbH, Jena (DE)

(72) Inventors: Philipp Riehl, Jena (DE); Joerg Reinhold, Jena (DE); Juergen Hillmann, Jena (DE); Tom Michalsky, Leipzig (DE); Daniel Krenzer, Wutha-Farnroda (DE); Holger Femel, Rothenstein (DE); Wolfgang Jaehne, Rothenstein (DE)

(73) Assignee: JENETRIC GmbH, Jena (DE)

( * ) Notice: Subject to any disclaimer, the term of this patent is extended or adjusted under 35 U.S.C. 154(b) by 0 days.

(21) Appl. No.: 16/565,950

(22) Filed: Sep. 10, 2019

(65) Prior Publication Data

US 2020/0089984 A1  Mar. 19, 2020

(30) Foreign Application Priority Data

Sep. 19, 2018 (DE) .................. 10 2018 122 917

(51) Int. Cl.
| | |
|---|---|
| *G06K 9/20* | (2006.01) |
| *G06K 9/00* | (2006.01) |
| *F21V 8/00* | (2006.01) |
| *H04N 1/028* | (2006.01) |

(52) U.S. Cl.
CPC .......... *G06K 9/209* (2013.01); *G02B 6/0025* (2013.01); *G02B 6/0038* (2013.01); *G02B 6/0073* (2013.01); *G06K 9/0004* (2013.01); *G02B 6/003* (2013.01); *G02B 6/0068* (2013.01); *G06K 9/00442* (2013.01); *G06K 9/00912* (2013.01);

(Continued)

(58) Field of Classification Search
None
See application file for complete search history.

(56) References Cited

U.S. PATENT DOCUMENTS

| 2012/0321149 A1 | 12/2012 | Carver et al. |
| 2017/0085813 A1 | 3/2017 | Reinhold et al. |
| 2017/0249494 A1 | 8/2017 | Zhang et al. |

(Continued)

FOREIGN PATENT DOCUMENTS

| DE | 102015115484 B3 | 1/2017 |
| WO | 2016/154378 A1 | 9/2016 |
| WO | 2017118030 A1 | 7/2017 |

*Primary Examiner* — Jerry Rahll
(74) *Attorney, Agent, or Firm* — Patentbar International, P.C.

(57) ABSTRACT

A device for direct optical recording of skin prints offers recording of human skin prints for personal identification permitting a display layer directly below the placement surface. A light guide layer arranged below the sensor layer has at least one LED at a narrow side and light out-coupling structures which, by means of an inclination angle c and differences in the refractive indices relative to neighboring layers, permit a directed coupling out of light at a defined angle which results in total internal reflection at the placement surface at the air interface and with a small divergence angle range of $\leq +/-15°$. A first adhesion layer between cover layer and sensor layer and a second adhesion layer between sensor layer and light guide layer are provided, the refractive indices of which are 1% to 30% lower than the refractive indices of light guide layer and sensor layer.

17 Claims, 11 Drawing Sheets

(52) U.S. Cl.
CPC ....... *G06K 9/2036* (2013.01); *H04N 1/02815* (2013.01)

(56) References Cited

U.S. PATENT DOCUMENTS

| | | |
|---|---|---|
| 2017/0351901 A1 | 12/2017 | Kim et al. |
| 2018/0005005 A1 | 1/2018 | He et al. |
| 2018/0121701 A1 | 5/2018 | Ling et al. |
| 2018/0128957 A1 | 5/2018 | Davis et al. |
| 2018/0165497 A1 | 6/2018 | Lee et al. |
| 2018/0225498 A1* | 8/2018 | Setlak ................ G06K 9/00026 |

* cited by examiner

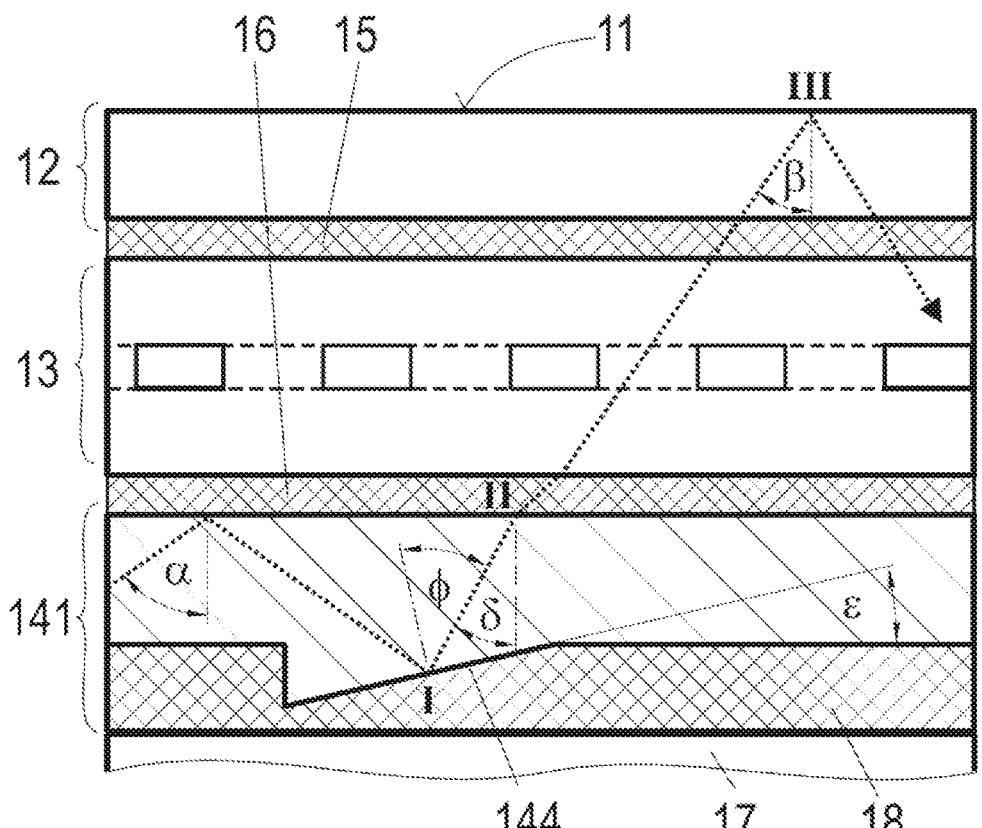
Fig. 4A
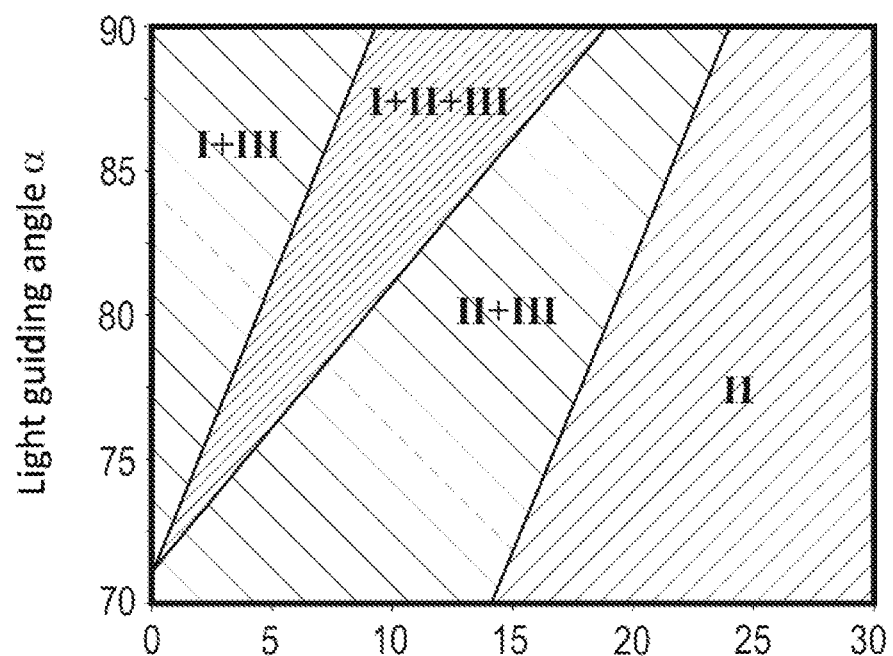
Fig. 4B  Inclination angle ε of the structure

DEVICE FOR THE DIRECT OPTICAL RECORDING OF SKIN PRINTS

RELATED APPLICATIONS

This application claims priority to German Patent Application No. DE 10 2018 122 917.8, filed Sep. 19, 2018, which is incorporated herein by reference in its entirety.

FIELD OF THE INVENTION

The invention is directed to a device for direct optical recording of skin prints, particularly for the recording of papillary lines of multiple-finger prints or handprints.

BACKGROUND OF THE INVENTION

On the one hand, there are systems known from the prior art which are used for the verification of biometric features in which there must be a match with stored features in order, for example, to allow access control for certain restricted areas.

Other systems are used for identification by matching with comparison databases, for example, issuance of passports and visas, verification of personal identity at border controls, particularly at airports, or for police records identification. The requirements respecting quality, resolution and fidelity to the original of the recorded images of skin prints are very comprehensive in the latter systems.

Thanks in no small part to strict requirements of organizations tasked with identification measures such as the Federal Bureau of Investigation (FBI), for example, there is a high degree of standardization in these systems in order to ensure the highest possible certainty of identification on the one hand, and, on the other hand, to allow comparison between datasets which have been recorded with a variety of systems.

A high-quality system design is needed to meet these requirement criteria. In an optical system, this means, for example, that requirements must be met not only by the recording sensor, or recording sensors, but also by the illumination and all of the other components required for imaging, especially when large skin surfaces, i.e., more than one finger (for example, an entire hand), are to be recorded simultaneously.

Currently, various systems are used for acquiring fingerprints and handprints which satisfy the above-mentioned strict requirements with respect to quality.

On the one hand, capacitive semitransparent TFT sensors are used in which user guidance can be realized by means of a display below the sensor. However, it is not possible to read security-relevant documents, e.g., passports, driver's licenses, tickets, boarding passes, etc., so that a separate device or at least an additional optical sensor layer would be necessary. However, this would drive up equipment costs.

On the other hand, devices are being marketed which realize direct optical scanning of skin prints, i.e., in which the object to be recorded (finger, four fingers or hand) is placed on a placement surface directly over the light-sensitive sensor array without using optically imaging systems such as macroscopic lenses, prisms, imaging gratings, etc. Further, these systems can combine the recording of skin prints with the advantages of visual user guidance and an optical recording of documents on the same placement surface by using optical semitransparent TFT sensors.

A system in which a display is positioned below the optical sensor for this purpose is already known from DE 10 2015 115 484 B3. In this case, the display functions simultaneously as illumination or is used as backlighting so that the superposed object is illuminated diffusely, i.e., nondirectionally. The light backscattered from the object is subsequently detected by the light-sensitive elements of a sensor. The thickness of the cover layer between the placement surface and the light-sensitive elements is limited to a few micrometers because the resolution and contrast decrease rapidly with increasing distance between sensor and placement surface.

However, various solutions are also known which allow or require a greater thickness of the cover layer while retaining the same image quality.

To this end, on the one hand, the illumination light of the backlighting is collimated as is known in various arrangements from US 2018/0121701 A1 (WO 2017/118030 A1). However, it has proven disadvantageous that additional optical elements must be integrated between the illumination and the placement surface in order to realize the required light shaping. This additional layer increases the thickness of the overall device, is expensive and is complicated to produce.

Similarly, it has been described in US 2018/0165497 A1 to embed in a flat panel display an optical image sensor which can comprise a fingerprint sensor. The construction comprises a display screen with a display area and a non-display area and a light-directing device which contacts the display screen with corresponding length and width and is formed of two cover plates connected to a low-refracting adhesion layer. The light is coupled in outside of the display layer of the flat panel screen, coupled into the bottom cover plate through a light-refracting layer below the display layer at an angle of between 70° and 75°, and further conducted in this bottom cover plate so as to undergo total reflection. A portion of this totally reflected light is coupled into the top cover plate at the light-refracting layer at a smaller angle and is thrown back in direction of the display at the outer air boundary as total internal reflection (TIR), and it can transmit through the low-refracting layer and can also pass the bottom cover plate without reflection. Since the display is an AMOLED (active matrix organic light-emitting diode), it can also be used as a sensor layer. Fingerprints can be detected in this way. By using IR light, veins can also be detected.

A disadvantage consists in the pointwise lateral coupling in of light via a diffraction grating, for which a laser source is required to couple the necessary light intensities into a light guide. Accordingly, the illumination in the light guide is carried out only within a triangular surface area. Further, the coupling out of light from the light guide via the usual scattering centers as is described, for example, in US 2018/0128957 A1 as illumination for high-quality recording of fingerprints which satisfies FBI standards is limited in that the proportion of illumination rays is rather unsatisfactorily small for the TIR principle.

SUMMARY OF THE INVENTION

It is the object of the invention to find a novel possibility for direct optical recording of skin prints of human autopodia which permits a display layer for user guidance directly below the placement surface under strict requirements for personal identification in accordance with FBI standards, in particular without a decrease in the spatial resolution of the fingerprint images.

In a device for direct optical recording of skin prints with a layer body which contains a placement surface formed by a cover layer of the layer body, a sensor layer and a light source unit, wherein the sensor layer has light-sensitive elements arranged in a sensor grid and transparent areas, the above-stated object is met according to the invention in that the light source unit is formed as light guide layer and is arranged below the sensor layer, wherein the light guide layer has a coupling in of light by means of LEDs at a narrow side, in that the light guide layer is provided with light out-coupling structures which, on the basis of an inclination angle of the light out-coupling structures and on the basis of differences in the refractive indices between the neighboring layers of the light guide layer up to the cover layer, permit a directed coupling out of light from the light guide layer at a defined angle which, after passing through all of the layers up to the cover layer, results in total internal reflection (TIR) at the placement surface at the air interface and with a small divergence angle range of ≤+/−15° in order to achieve a high spatial resolution of the skin print to be recorded, in that there is a first adhesion layer between cover layer and sensor layer and a second adhesion layer between sensor layer and light guide layer, wherein the second adhesion layer has a refractive index which is at least 1% lower and at most 30% lower than the refractive indices of the light guide layer and of the sensor layer which are between 1.45 and 1.8, and the first adhesion layer has a refractive index which is at least as high as that of the second adhesion layer.

The LED light in-coupling advantageously has precollimation optics at the narrow side of the light guide layer, which precollimation optics are arranged downstream of the LEDs and with which a horizontal divergence between 2.5° and 30° is adjusted in the beam bundle coupled into the light guide layer in each instance in order to achieve an improved resolution of the skin print to be recorded.

The precollimation optics are advisably a refractive optical element which is arranged at the narrow side of the light guide layer and is preferably incorporated in the form of a convex lens or a GRIN lens at the narrow side of the light guide layer. In another preferred construction, the precollimation optics are formed inside the light guide layer in the form of a concave lens from a medium with a lower refractive index than the light guide layer.

A plurality of closely adjacent LEDs is advisably arranged along a narrow side of the light guide layer so that the beam bundles thereof bring about an adjusted light intensity in the light guide layer owing to the horizontal divergence after a defined coupling-in length.

Further, it has proven advantageous for coupling in light that a corner coupling-in of light with at least one LED is arranged at least at one narrow side which is provided by cutting a corner of the light guide layer, and a drop in intensity of the divergent beam bundle coupled into the light guide layer is compensated by an increasing fill factor of the magnitude and density of the light out-coupling structures. In this regard, a diffuser is advisably arranged between the LED and the narrow side of the cut corner of the light guide layer for uniform distribution of the coupled-in light in all solid angles so that there is no need to compensate for a decrease in light at the cut corner of adjacent narrow sides of the light guide layer.

It has further proven to be advantageous that the refractive index of the first adhesion layer is exactly the same as the refractive index of the second adhesion layer so that a component of stray light exiting from the skin areas placed on the placement surface as a result of excitation generated by ambient light is cut out from a propagation in direction of the sensor layer due to TIR within the cover layer.

The layer body preferably has a display arranged under the light guide for displaying user information. The display can be an LCD, OLED or QLED, etc. The display can be fastened to the underside of the light guide layer either removably without adhesive layer or by means of a further low-refracting adhesion layer with a refractive index that is at least as high as that of the second adhesion layer, so that scatter light or light reflected at the back side of the sensor layer can be absorbed by the display. Accordingly, the light guide layer is more independent from the reflection component of the sensor layer and can always have the same light out-coupling structures. Furthermore, the layer body has greater mechanical stability due to its being glued together with the sturdy display.

Further, the display can be used as additional luminescent layer for illuminating documents in order to make light available for document illumination in addition to the illumination of the light guide layer provided through residual divergence of the TIR angle range.

The light in-coupling advisably comprises a plurality of tightly packed LEDs with a mean spacing of between 1 mm and 10 mm which are precollimated in a defined manner such that the LEDs have overlapping light emission cones after an in-coupling length of at least 2 mm in order to generate a homogeneous illumination. The mean spacing of the LEDs preferably amounts to 3 to 6 mm, preferably with a full width at half maximum (FWHM) of the emission of 10° and a divergence of ≤+/−5°, where the in-coupling length preferably amounts to 2 to 20 mm.

In a specific construction of the invention, the light out-coupling structures are advantageously formed such that only between 50% and 95% of the illumination light coupled out of the light guide layer at the air interface at the placement surface is a light component that undergoes total reflection in the cover layer, while a remaining residual light component can be utilized for the illumination of documents.

The light guide layer advisably has a fill factor of light out-coupling structures formed by the magnitude and spacing of the light out-coupling structures that is at least large enough for each location on the light guide layer that the light out-coupling structures are not visible in a print image of skin areas to be recorded. The light out-coupling structures preferably have a spacing s that is very much smaller than a resulting beam divergence of the light out-coupling structures of the light guide layer. Further, the light guide layer has high transparency so that opacity amounts to less than 20%.

In another advantageous configuration, there is arranged under the transparent light guide layer a further transparent light guide layer which is connected to the transparent light guide layer above it by a further adhesion layer having a low refractive index like the first adhesion layer and second adhesion layer.

In this regard, a first variant has proven advisable wherein the light guide layer and the further light guide layer have the light in-coupling on opposite narrow sides of the layer body so that the further light guide layer may be resorted to in case the image of a skin area recorded with the primary light guide layer is of poor quality (defect gaps, pixels, wet fingers, dry fingers, . . . ), for which purpose a second image which is recorded with the further light guide layer and which is offset with respect to the first image can be used individually or can be fused with the first image (taking into account any offset).

In a second advantageous variant, the light guide layer and the further light guide layer can have the light in-coupling at the same narrow side of the layer body and can have light out-coupling structures with the same orientation, and the light guide layer and further light guide layer can have light out-coupling structures with inclination angles c that differ from one another to the extent that these differing inclination angles c respectively generate illumination angles 13 which result in total reflection at the placement surface. This is of interest for the efficiency of the system when both light guide layers are being operated in a quasi-parallel manner but the light is coupled out at different locations so that higher light intensities are made possible for the illumination of the superposed skin area. Further light guide layers can also be advantageously realized with corresponding LED arrays, e.g., for illuminating certain limited areas, for example, in order to illuminate documents and fingers simultaneously.

The invention is based on the fundamental consideration that when the functions of fingerprint recording and document recording are combined in one device that should also implement display functions for user guidance in the placement surface, the light intensity of the skin prints generally becomes insufficient or the resolution and the contrast of the recordings no longer meet the required FBI standard. The invention solves these problems in that a light guide layer is arranged under a semitransparent sensor layer and light is coupled in by means of LEDs at a narrow side of the light guide layer, and the light guide layer is provided with light out-coupling structures which, based on the inclination angle of the light out-coupling structures and based on the differences in refractive indices between the neighboring layers of the light guide layer to the cover layer, leads to a directed out-coupling of light at a defined angle which leads to TIR at the placement surface at the air interface with a small divergence angle range of ≤+/−15° in order to achieve a high spatial resolution of the skin print to be recorded. The out-coupling of light can be further improved selectively by the adhesion layers and neighboring layers having refractive indices adapted to the light guide layer.

The invention makes it possible to record skin prints of human autopodia by means of an optical direct scanner with a high quality in conformity to FBI standards and, further, to display information for user guidance by means of a display under the placement surface and sensor surface without leading to a deterioration of the spatial resolution of the skin print images.

BRIEF DESCRIPTION OF THE DRAWINGS

The invention will be described more fully in the following with reference to embodiment examples. The drawings show:

FIG. 4A shows a section of the layer body according to the configuration from FIG. 3a with an enlarged wedge-shaped light out-coupling structure and diagram of a representative beam progression which is coupled out at the light out-coupling structure toward the placement surface and reaches the latter under a total reflection angle;

FIG. 4B is based on FIG. 4A, showing a diagram of the light guiding angle of the light guided in the light guide layer over the inclination angle of the wedge-shaped structure to show the dependence of the beam progression through the interfaces of the layer body due to different refraction behaviors, as state diagram;

FIG. 9B shows a further embodiment of the light in-coupling at a narrow side of the light guide layer, wherein LEDs which are precollimated by the manufacturer are directly beamed in, FIG. 9C shows still another embodiment of the light in-coupling at a narrow side of the light guide layer, wherein LEDs with precollimation optics arranged therebetween are coupled in;

DETAILED DESCRIPTION OF THE PREFERRED EMBODIMENTS

Figure 1:
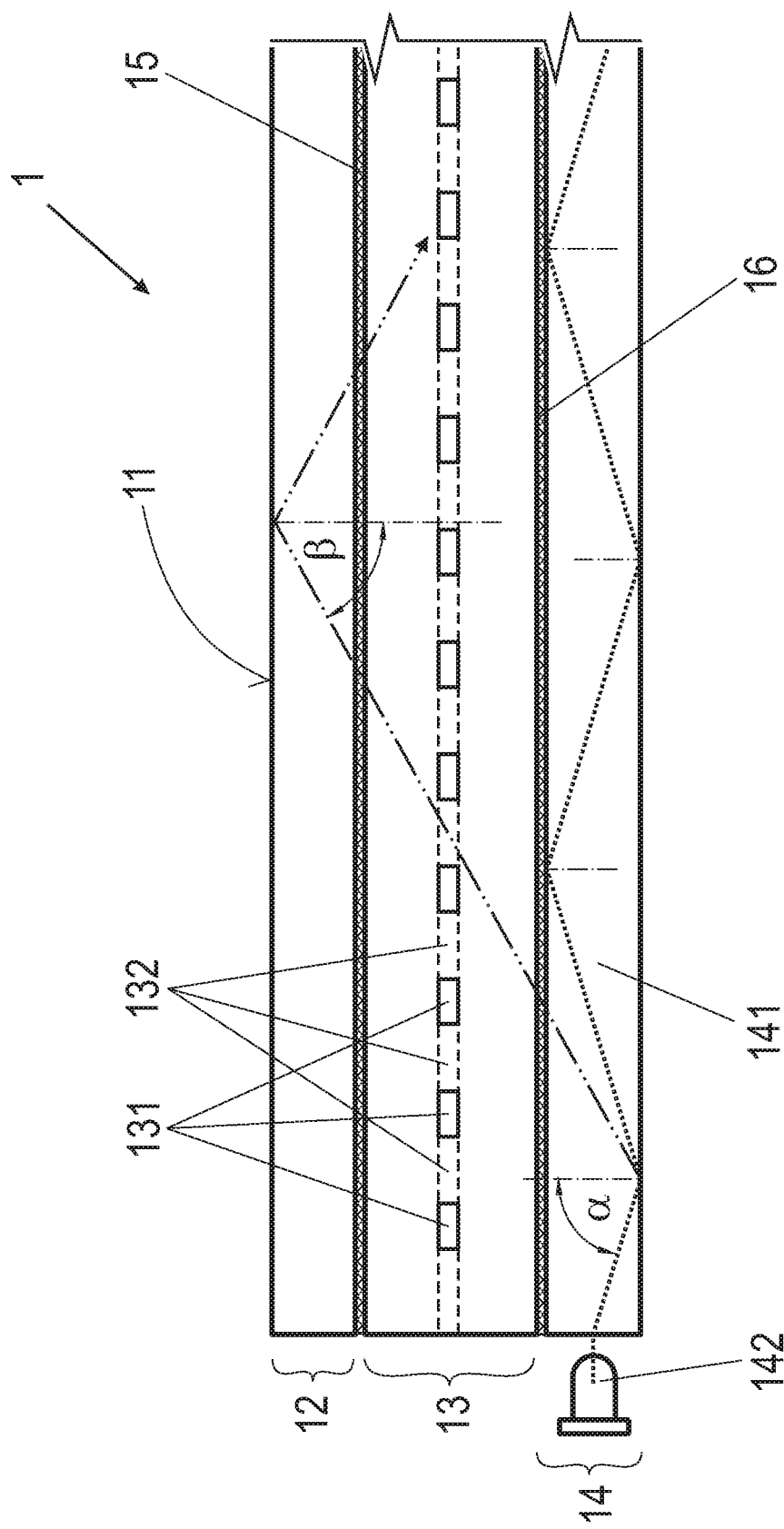
FIG. 1 shows a basic configuration of the device according to the invention with a layer body comprising a cover layer with placement surface for objects to be recorded, a sensor layer and a light guide layer as light source.

In a basic construction, shown in FIG. 1, the device according to the invention comprises a layer body 1 which, starting with a placement surface 11 for the objects to be recorded (finger 2 or document 3, not shown), has a cover layer 12 whose outer surface provides the placement surface 11, a sensor layer 13 with light-sensitive sensor elements 131 which has a defined semitransparency for the light of the planar light source unit 14 which is located under it and which is formed as a light guide layer 141 and at which one or more LEDs 142 are provided at least at one narrow side as light sources for coupling in light which has been pre-collimated to a greater or lesser extent. An adhesive layer in the form of a first adhesion layer 15 is arranged between the cover layer 12 of layer body 1 and the sensor layer 13, and a second adhesion layer 16 is arranged as adhesive layer between sensor layer 13 and light guide layer 141. The second adhesion layer 16 has a refractive index which is at least 1% and at most 30% lower than the refractive indices of light guide layer 141 and sensor layer 13 which are between 1.45 and 1.8, and the first adhesion layer 15 has a refractive index which is at least as high as that of the second adhesion layer 16.

The light emitted by the LED(s) 142 is conveyed at a light guiding angle α based on the light guide characteristics of the light guide layer 141. Because of the light out-coupling structures 144 of the light guide layer 141 which will be described in detail in the following, components of the light propagating in the light guide layer 141 at light guiding angle α are coupled out at a defined angle such that an illumination angle β for total internal reflection (TIR) is adjusted at the placement surface 11 at the air interface after passing all of the layers of the layer body 1 up to cover layer 12. The light out-coupling structures 141 permit light beams to be coupled out with a small divergence angle range of ≤+/−15° in order to achieve a high spatial resolution of the skin print to be recorded.

It should be noted here that the above-defined refractive indices which should deviate slightly from that of the light guide layer 141 lose their significance precisely when the thickness of the adhesion layers approximates the order of magnitude of the utilized light wavelength. In this specific case, the light does not see the adhesion layers, and the refractive indices of the subsequent layers which define the light refraction or total reflection are applicable.

Figure 2:
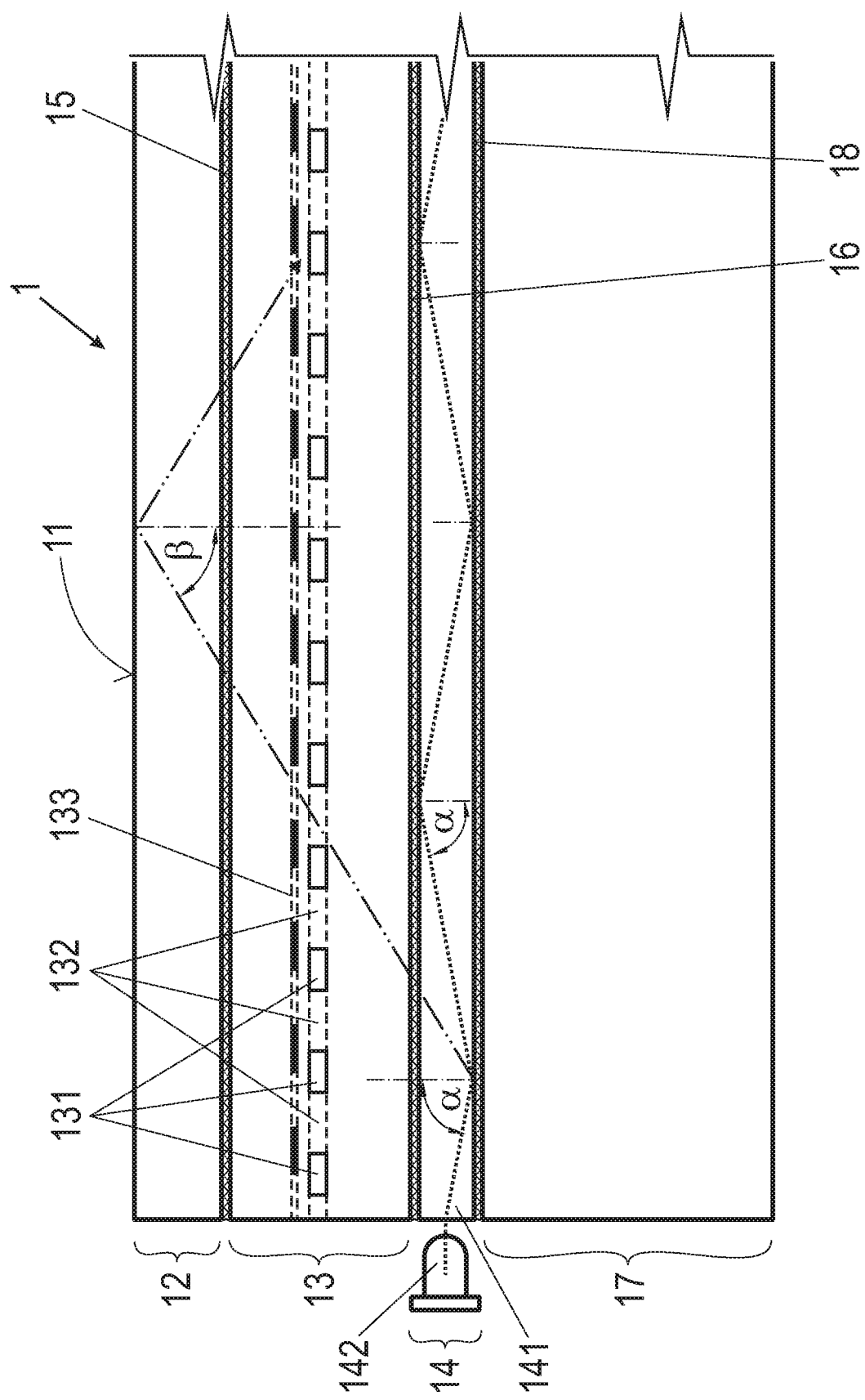
FIG. 2 shows an advantageous configuration of the invention with a display for user guidance which is arranged below the construction shown in FIG. 1, wherein an additional diaphragm layer is provided above the sensor elements for reducing the light incidence of a plurality of transverse locations to one and the same sensor element.

FIG. 2 shows a construction of the device which is expanded from that shown in FIG. 1 and which has a display 17 under the light guide layer 141. The display 17 can either be removably (without an adhesive layer) clamped to, clamped in or otherwise fastened to the light guide layer 141. However, FIG. 2 shows a construction with a further adhesion layer 18 which has a low refractive index comparable to the second adhesion layer 16 and which permanently bonds the display 17 to the light guide layer 141.

Adhesion layers 15, 16, 18 are transparent for at least components of illumination light from the light guide layer 141 and of an optional display 17 arranged under the light guide layer 141. This can be an optically transparent double-sided adhesive tape (OCA) or a liquid adhesive which has been cured, for example, by heat or UV radiation (LOCA). For example, these adhesives can be silicones, acrylates or epoxies.

Polycarbonate (PC), polymethylmethacrylate (PMMA), glass or other optically transparent materials with a refractive index n~1.5 are utilized as light guide layer 141. However, other materials with a refractive index between 1.45 and 2.0 can also be used as light guide layer 141. The light-guiding effect at the locations on the light guide layer 141 without light out-coupling structures 144 is realized through the difference in refractive indices between light guide layer 141 and second and further adhesion layers 16, 18.

Sensor layer 13 has light-sensitive elements 131 arranged in a grid with a resolution of 100 ppi to 1000 ppi and, depending on the detected light intensity, passes on electronic signals which are converted into a grayscale image. The light-sensitive elements 131 of sensor layer 13 are photodiodes with a defined sensitivity for a determined spectral region of the light. In a preferred embodiment form, the sensitivity of the light-sensitive elements 131 is spectrally adapted to the emitted illumination light of the light guide layer 141 in order to increase the signal-to-noise ratio (SNR).

It should be noted that all of the materials and parameters of the adhesion layers 15, 16 and 18, light guide layer 141 and sensor layer 13 indicated above also apply to all of the other arrangements described.

Due to the semitransparency of the sensor layer 13 in which the transparency is advantageously achieved in that every sensor element 131 within the regular pixel raster of the sensor layer 13 contains a transparent area 132, instructions or other user information can be seen by the user of the device with sufficiently high intensity at the placement surface 11 of the cover layer 12.

The information on the display 17 can be displayed without distortions, opacity or color limitations as a result of the fill factor of nontransparent sensor elements 131 and transparent areas 132, which fill factor is uniformly defined over the entire sensor layer 13.

In order to improve the resolution of a recorded skin print 21 and, further, to reduce the influence of stray light 4 (shown only in FIG. 5) which results from ambient light or from the internal light of the display 17, a diaphragm layer 133 is arranged above the light-sensitive elements 131 of sensor layer 13 in the preferred embodiment form of FIG. 2 for limiting the detectable angle range of each light-sensitive element 131. This reduces the influence of horizontal and vertical divergence of the illumination light and, consequently, thicker cover layers 12 or additional substrate layers 172 can be used while retaining the same resolution in order, for example, to facilitate protection and/or stability of the layer body 1 and of the entire device.

Nontransparent diaphragm materials are needed to effectively block stray light or illumination angles which are not to be detected. Materials which are used because of their favorable amenability to structuring in photolithographic exposure processes, for example, metals such as chromium, aluminum, gold, molybdenum, copper, silver, silicon, are preferred for the individual diaphragms in the diaphragm layer 133. However, owing to the reflective characteristics of these materials, unwanted reflections can come about at the surfaces of the diaphragms which can have a limiting effect on the contrast of the image recording, can increase noise or can produce double images. Therefore, absorbent organic materials, e.g., polytetrafluoroethylene, and absorbent inorganic materials such as diamond-like carbon layers, black chrome, copper indium disulfide or materials with a specific microstructure are preferably used. Materials which can be arranged as structured diaphragm layer 133 over the light-sensitive elements 131 of the sensor layer 13 via printing methods, e.g., screen printing, are particularly preferred because they can be produced quickly, flexibly and inexpensively. In printing methods, chiefly organic materials are used for this purpose.

In a further embodiment form, the light-sensitive elements 131 of the sensor layer 13 have an electronic control unit for controlling the exposure time (not shown), e.g., as rolling shutter or global shutter, as is disclosed in US 2017/0085813 A1. This makes it possible for the exposure time and, accordingly, the integration time of the light-sensitive elements 131 to be adapted to the various brightnesses of the display 17 and ambient light. This exposure time varies depending on the circumstances under which the device according to the invention is used by the user and depending on different ambient light conditions. As a result of this electronic shutter control, it is not compulsory for the display 17 to be switched off during the recording of skin prints 21 and it is nevertheless possible to record high-contrast skin prints 21.

Figure 3A:
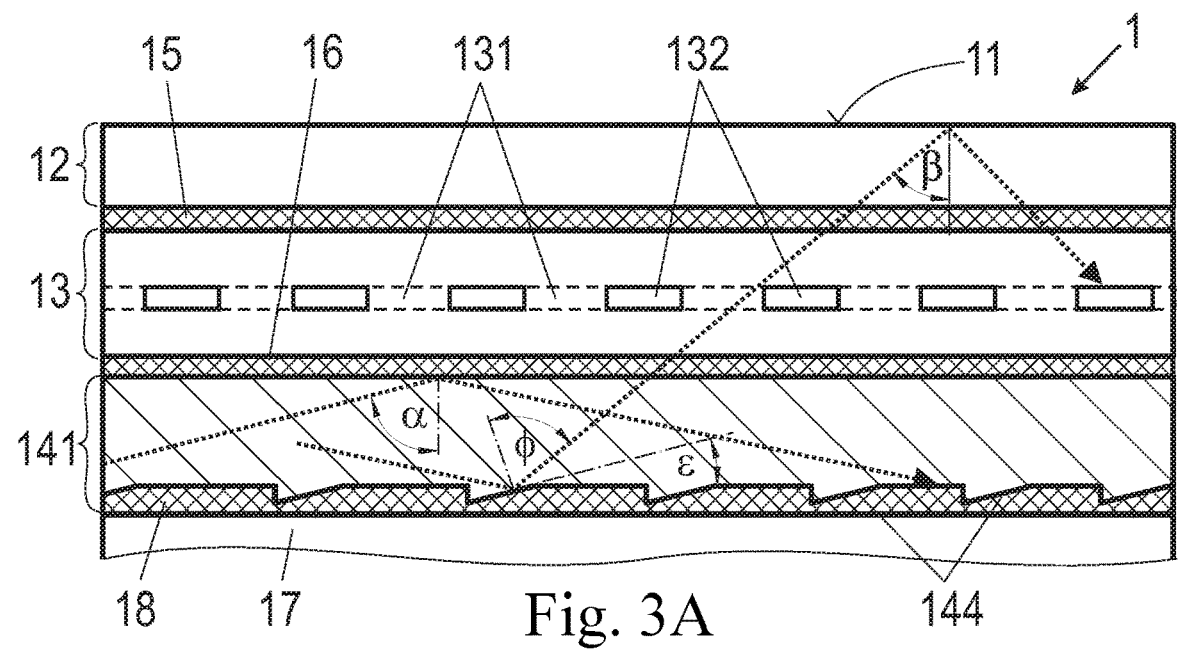
FIG. 3A shows a section of the layer body with special light out-coupling structures at the underside of the light guide layer for coupling out beam bundles which reach the placement surface at a total reflection angle.

FIG. 3A shows an embodiment form of the layer body 1 in a side view with an enlarged view of the light guide layer 141, wherein, for example, a plurality of light out-coupling structures 144 are shown at the underside of the light guide layer 141 with an inclination angle E. When the light guided in the light guide layer 141 at light guiding angle α impinges on a light out-coupling structure 144 at inclination angle E, this results in a reflection angle β relative to the perpendicular of light out-coupling structure 144, where β=α-ε. As a result of its angular change, the beam bundle reflected at the light out-coupling structure 144 can now no longer undergo total reflection at the second adhesion layer 16, but rather passes through this second adhesion layer 16 and the sensor layer 13, first adhesion layer 15 and cover layer 12 which are arranged above it. Depending on the refractive index of cover layer 12, the illumination light impinging on the placement surface 11 has an illumination angle β which totally reflects the illumination light at the placement surface 11 (air interface) and makes it possible to record skin prints 21 (not shown) according to the principle of frustrated total internal reflection (FTIR or, for short, TIR).

Figure 3B:
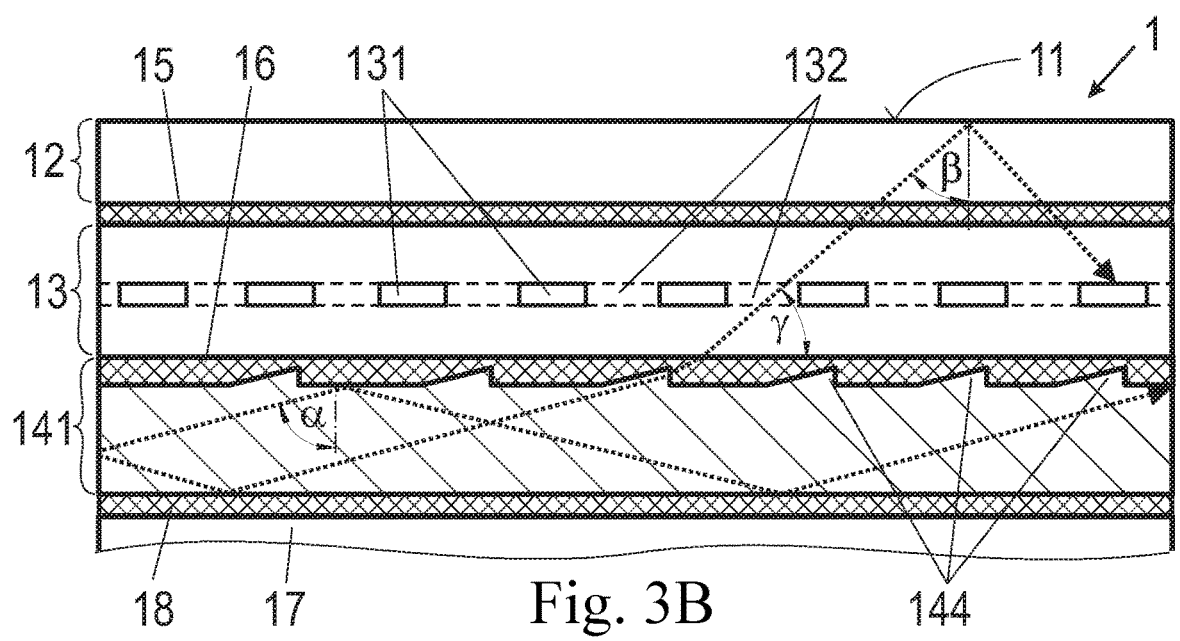
FIG. 3B shows a section of the layer body with special light out-coupling structures on the upper surface of the light guide layer for coupling out beam bundles which reach the placement surface at a total reflection angle.

FIG. 3B shows a further embodiment form of the layer body 1 in a side view with an enlarged view of the light guide layer 141. In this example, a plurality of light out-coupling structures 144 is provided at the upper side of the light guide layer 141. The light out-coupling structures 144 are formed in such a way that, when impinging on the light out-coupling structures 144, light guided in the light guide layer 141 is coupled out of the light guide layer 141 in direction of the cover layer 12 at a defined refraction angle α a first time at the interface with the second adhesion layer 16 located above it and a second time at the interface with sensor layer 13. When impinging on the light out-coupling structure 144, the principal ray of the light guided in the light guide layer 141 is coupled out at angle α, including a divergence, wherein there is no further limiting of the divergence by the inclination angle ε (not shown) of the light out-coupling structures 144. While this makes the coupling out of light more efficient with respect to the light intensity, the vertical divergence of the coupled-out beam bundle is greater than that in FIG. 3A, which can result in decreased resolution. The maximum possible change in the angle between α and β is also lower than in FIG. 3A.

Figure 3C:
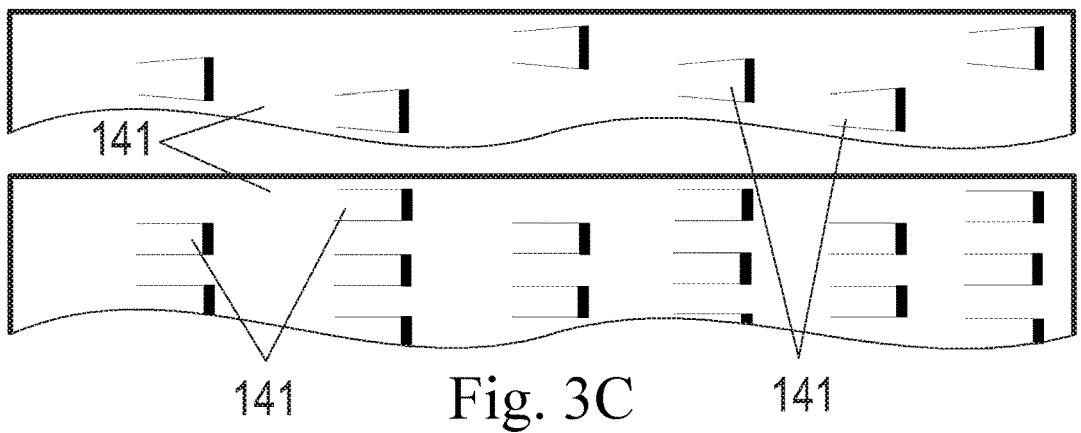
FIG. 3C shows two portions of the light guide layer with differently shaped light out-coupling structures of the light guide layer of FIG. 3B in a top view in which the light out-coupling structures are quadrilateral surfaces, e.g., trapezoids, rectangles, which slope upward in direction of light incidence.

With respect to the type and shape of the light out-coupling structures 144 in the material of the light guide layer 141, two examples for the shaping and distribution for a section of the light guide layer 141 are shown in FIG. 3C as top views to illustrate the light out-coupling structure according to FIG. 3A and FIG. 3B. Apart from the rectangle shapes and trapezoid shapes shown in the figures, triangles, circle sectors or circle segments or portions of ellipses are also suitable.

FIG. 4A and FIG. 4B show the relationships for the embodiment form in FIG. 3A between light guiding angle α, illumination angle β, reflection angle φ, exit angle δ and inclination angle ε. Preferential angles (exit angles δ) under which illumination light is coupled out of the light guide layer 141 are defined depending on the differences in refractive indices between light guide layer 141 and the adjoining adhesion layers 16 and 18. In this respect, a schematic beam path for light out-coupling structures 144 at the underside of light guide layer 141 is shown in a side view in FIG. 4A, wherein the light guide layer 141 has a refractive index of n=1.49 and the adjoining adhesion layers 16 and 18 have a refractive index of n=1.41, for example.

FIG. 4B further contains the three conditions (designated by Roman numerals I, II, III) that must be met in order to ensure proper operation of the device:

I: Guided rays (α>71°) must undergo total reflection at light out-coupling structure 144

II: The ray which is deflected through the light out-coupling structure 144 and which impinges at the surface of the light guide layer 141 with exit angle δ=α-2·ε may not undergo total reflection $$\delta < \sin^{-1}\frac{1.41}{1.49} < 71°$$

III: Total reflection must take place at the cover layer/air interface (assuming n=1.49 for cover layer 12)

$$\delta > \sin^{-1}\frac{1.00}{1.49} = 42°$$

The diagram in FIG. 4B shows the combinations of the light guiding angle α of the light guided in the light guide layer 141 and inclination angle c of the light out-coupling structures 144 which are allowed for the numerical example mentioned above and which contribute (I+II+III) to the imaging according to the invention during the recording of a skin print 21. For an inclination angel c of light out-coupling structures 144 of ε~10, most of the rays which are coupled out originally had a light guiding angle of α=85°+/−5°. Accordingly, an angle spectrum β~δ=65°+/−5° results for sensor layer 13 and cover layer 12 with refractive index similar to that of light guide layer 141 (n~1.5). The uniform coupling out of light on the entire surface of the light guide layer 141 and a correspondingly homogeneous illumination of a skin print 21 placed on the placement surface 11 is realized through the adaptation of a fill factor of the light out-coupling structures 144.

In the embodiment form with light out-coupling structures such as is shown in FIG. 3A, the vertical divergence of the coupled-out illumination light can be adjusted very precisely compared with the embodiment form in FIG. 3B via the inclination angle c of the light out-coupling structures 144 and the difference in the refractive indices between the light guide layer 141 and the adjacent adhesion layers 16, 18. Depending on the case of application, the device according to the invention can be optimized more in the direction of light intensity or in the direction of a narrow angle spectrum of the illumination light. High-quality skin prints 21 with a high resolution are obtained in that the light coupled out of the light guide layer 141 has a very small divergence, i.e., the coupled out angle spectrum is small.

Figure 5:
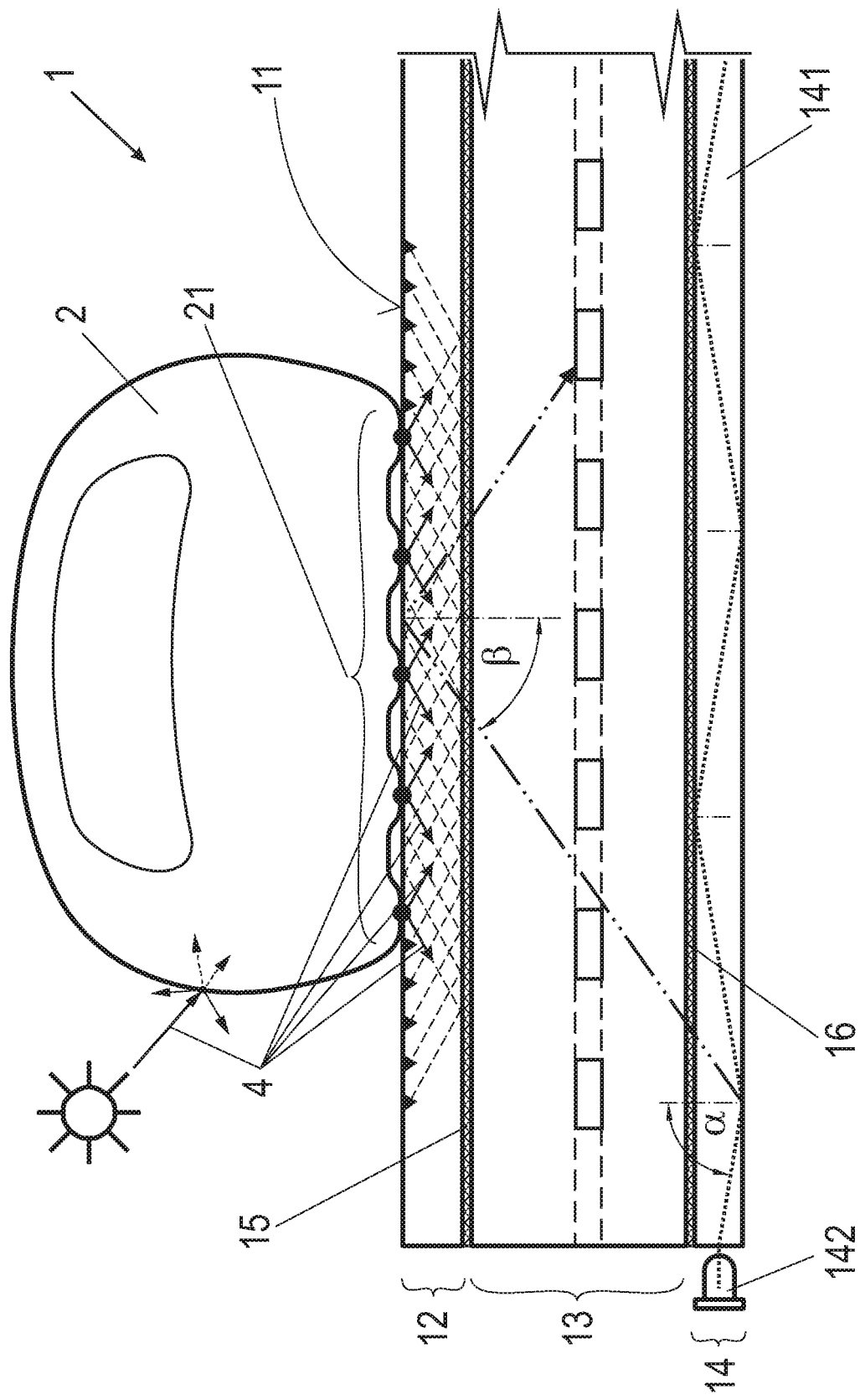
FIG. 5 shows a section of the layer body according to FIG. 1 with superposed finger under the influence of ambient light (sun) which is obstructed, i.e., masked, from the sensor elements of the sensor layer inside of the cover layer through total reflection in this construction.

In a preferred embodiment form shown in FIG. 5, a first adhesion layer 15 between cover layer 12 and sensor layer 13 which has a refractive index that is as high as the refractive index of the second adhesion layer 16 between sensor layer 13 and light guide layer 141 is used to reduce the influence of stray light 4 which is mainly caused by ambient light. Ambient light during the recording of skin prints 21 ensures that the skin of the finger 2 is illuminated and light is coupled into cover layer 12 via the skin ridges. This takes place because of multiple scattering in the skin and accordingly couples portions of the ambient light into the cover layer 12 via the skin area positioned on the placement surface 11. This stray light 4 impairs the recording of skin prints 21 because the stray light 4 causes a reduction in contrast in the final image. Therefore, a component of the stray light 4 does not reach the sensor layer 13 because components of stray light 4 within the cover layer 12 do not satisfy the conditions for total reflection at the interface between cover layer 12 and first adhesion layer 15.

For example, if glass (n~1.5) and a first adhesion layer 15 with a refractive index of 1.4 are used as cover layer 12, stray light 4 with angles greater than 70° orthogonal to the placement surface 11 will then undergo total reflection at the interface of cover layer 12 and first adhesion layer 15 and does not reach the sensor layer 13. Accordingly, components of stray light 4 are not detected by the light-sensitive sensor elements 131 and the contrast of the skin prints 21 is improved. In a particularly preferred embodiment form, a material with a higher refractive index is used for the cover layer 12. Flint glass or sapphire, for example, have a refractive index of n>1.7 so that even more stray light components are totally reflected inside of the cover layer 12 and do not reach the sensor layer 13. At a refractive index of n=1.7, all of the stray light components with an angle greater than 56° undergo total reflection. The greater the difference in the refractive indices between cover layer 12 and first adhesion layer 15, the more stray light 4 will be totally reflected within the cover layer 12 and not detected by the light-sensitive elements 131 of the sensor layer 13.

Figure 6:
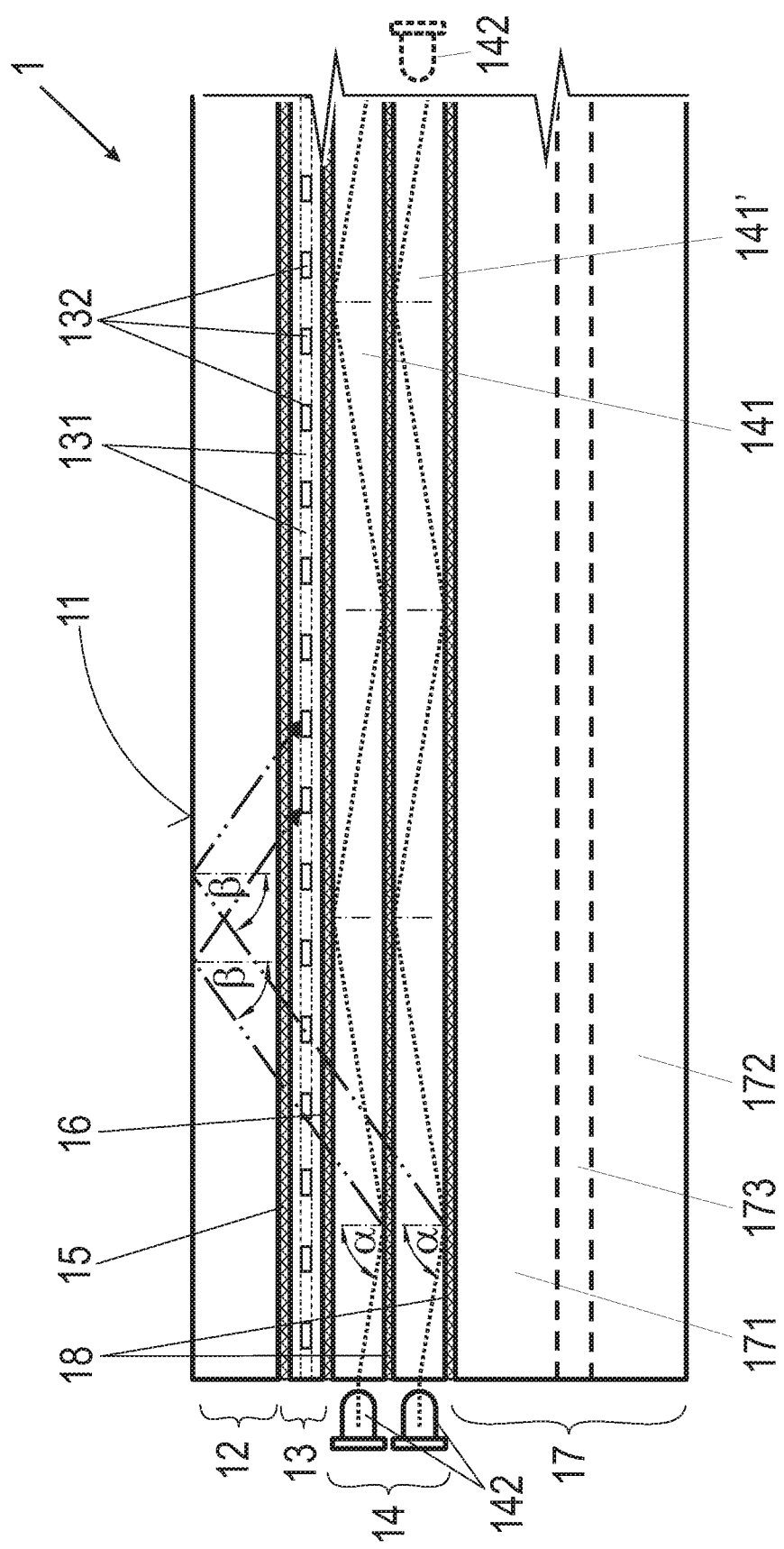
FIG. 6 shows a particular embodiment form of the device according to the invention in which two light guide layers are provided one directly above the other below the sensor layer and above a display under the latter.

FIG. 6 shows a further advisable construction of the device according to the invention which, in contrast to FIG. 2, has two light guide layers 141, 141' adjacent to one another. The further light guide layer 141' yields a number of advantages.

Owing to the high transparency of light guides, a plurality of light guide layers 141, 141' can optionally be arranged one above the other and connected to one another through a further low-refracting adhesive. A further adhesion layer 18 of this kind should have the same refractive index as the second adhesion layer 16 between the light guide layer 141 and the sensor layer 13. First, there are various possible ways for light to be supplied to the light guide layers 141 and 141'. In a first variant shown in FIG. 6, the light guide layers 141, 141' are provided with LEDs 142 from the same narrow side of the layer body 1. The first advantage is an increased intensity of the coupled-out light, since both light guide layers 141 are highly transparent and the further light guide layer 141' does not, in effect, see the first light guide layer 141. This results in the advantage of a protection against ambient light because an increase in the TIR illumination intensity (which can accordingly be "adjusted up") and, in parallel with this, a reduced exposure time (adjusting down the exposure times of an electronic shutter implemented in sensor layer 13 in case of extensive ambient light) shifts the illumination ratio in the direction of TIR illumination intensity so that the influence of ambient light is reduced relatively and a high-contrast recording of skin prints is therefore made possible.

Further, considered from the top, the light rays which are coupled out parallel to one another are offset relative to one another and contribute to the homogenization of the illumination in that each light guide layer 141 illuminates only a determined portion of the placement surface 11 so that larger placement surfaces 11, for example, for recording entire hand surfaces or more than one hand, can also be illuminated very well.

The second advantage consists in that a plurality of recordings with exclusive illumination with one of the similar light guide layers 141, 141', etc. in each instance can be made consecutively, the images can be compared and the better images selected. Apart from measures for liveness detection, this is of interest for the recording of dry and moist skin prints 21. Illumination light with other wavelengths, (e.g., UV, IR) in addition to VIS spectral regions can be used in the further light guide layer 141' for liveness detection.

A third advantage results when the two light guide layers 141 have different inclination angles c of their light out-coupling structures 144 and the further light guide layer 141', for example, causes an illumination angle β' which is not suitable for TIR but, rather, exits outward directly through the placement surface 11 of the cover layer 12 and can illuminate a document 3 which is placed on the placement surface 11. The first light guide layer 141 can be switched off additionally for this document reading mode so that no TIR light at all is generated. This makes possible a higher-contrast recording of documents 3 because the illumination light of the light guide layer 141 undergoing total internal reflection does not interfere during the recording when it can be switched off.

In a modified variant in FIG. 6, the light of the LEDs 142 for each of the light guide layers 141 and 141' can be introduced at different, preferably opposite narrow sides of the layer body 1. This variant is symbolized by the LED 146 shown in dashed lines on the right-hand narrow side of the light guide layer 141' and illustrates this selectable alternative.

In this alternative case, the rays which are coupled out of the light guide layers 141 and 141' result in two different images with an offset that can be subtracted out, and the two fingerprint images are accordingly compared with one another for purposes of improving quality, and the better image is selected or both images are fused with one another by subsequent image processing.

Figure 7:
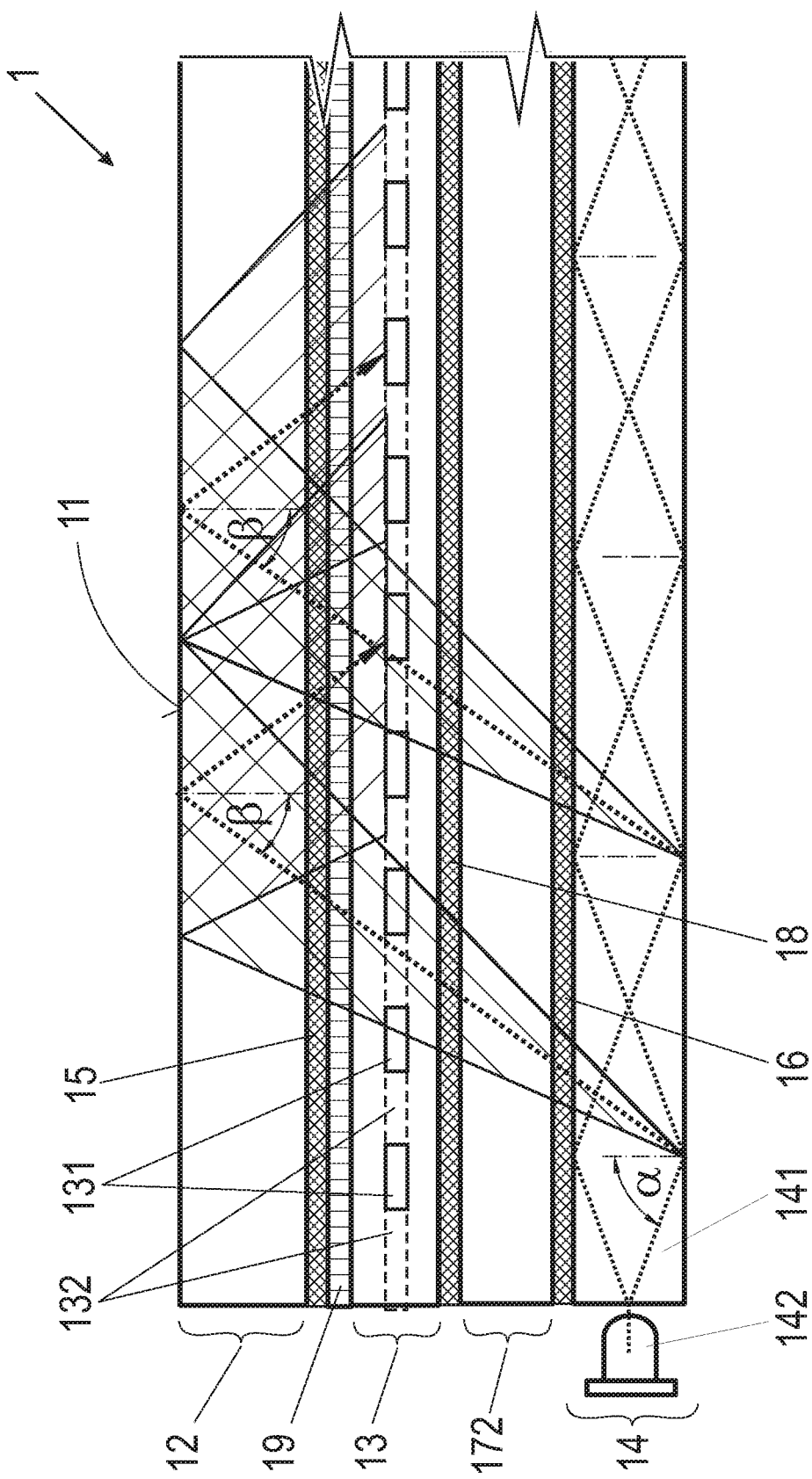
FIG. 7 shows another advantageous embodiment form of the invention which has an additional spectral filter layer above the sensor layer and an additional substrate layer between the sensor layer and light guide layer.

FIG. 7 shows another modified configuration of FIG. 2 which is distinguished in that an additional substrate 172 is inserted between sensor layer 13 and light guide layer 141, which is advantageous for reasons of stability as well as for the homogenization of illumination.

Further, a filter layer which, above all, can carry out an additional elimination of ambient light and which is shown, for example, as full-surface area spectral filter layer 19 is added above the sensor layer 13.

The spectral filter layer 19 can preferably be applied in a structured manner only over the light-sensitive elements 131 of sensor layer 13 so that the light of a light-emitting display 17 arranged under the device remains unaffected by the spectral filter layer 19. In a preferred embodiment form, the spectral filter layer 19 is a narrowband filter and is adapted to the wavelength of the illumination light of the light guide layer 141 so that it is transparent to most parts of the illumination light and acts absorbently for residual light components.

As will further be appreciated from FIG. 7, a more pronounced widening of the illumination beams is to be observed as a result of the greater layer thickness between light guide layer 141 and placement surface 11 of cover layer 12. This circumstance is illustrated by two beam bundles which are coupled out at the underside of the light guide layer 141 and which already overlap at the placement surface 11 of cover layer 12 owing to the additional substrate 172.

In this invention, the signal spreading or widening of the beam bundles is closely related to a fill factor of the light out-coupling structures 144 of light guide layer 141. If the fill factor is 1%, for example, and each light out-coupling structure 144 has a length of approximately 10 μm (or has a diameter of 10 μm), the average length to the next light out-coupling structure 1144 is around 1 mm. The signal spreading depends on the divergence (FWHM of, e.g., 10° or +/−5° under illumination angle β) and on the distance between the light out-coupling elements 144 and the placement surface 11 (e.g., 5.5 mm) and, in this example, gives a signal spreading of a coupled-out light point of approximately 8.5 mm. This means that the maximum distance between the light out-coupling structures 144 in this example should not exceed approximately 4 mm. As is shown above, however, the distance is only approximately 1 mm so that every point on the placement surface 11 is illuminated by a plurality of light out-coupling elements 144 and the sensor layer 13 does not "see" the individual discretely emitting light points of the light out-coupling structures 144 of light guide layer 141.

There are two variants available for the simultaneous illumination of the placement surface 11 without intensity peaks through individual light out-coupling structures 144.

On the one hand, it is possible that the light out-coupling structures 144 have a spacing s (not shown) which is very much smaller than their signal spreading up to the placement surface 11 because the beam bundles of the individual light out-coupling structures 144 then overlap before they impinge on the placement surface 11 of the cover layer 12 or subsequently reflect in direction of sensor layer 13. On the other hand, in a second variant, it is possible that the light out-coupling structures 144 have a spacing s which is very much smaller than the mean spacing of the light-sensitive elements because, in this case, the signal spreading of the beam bundles is not compulsory.

Figure 8:
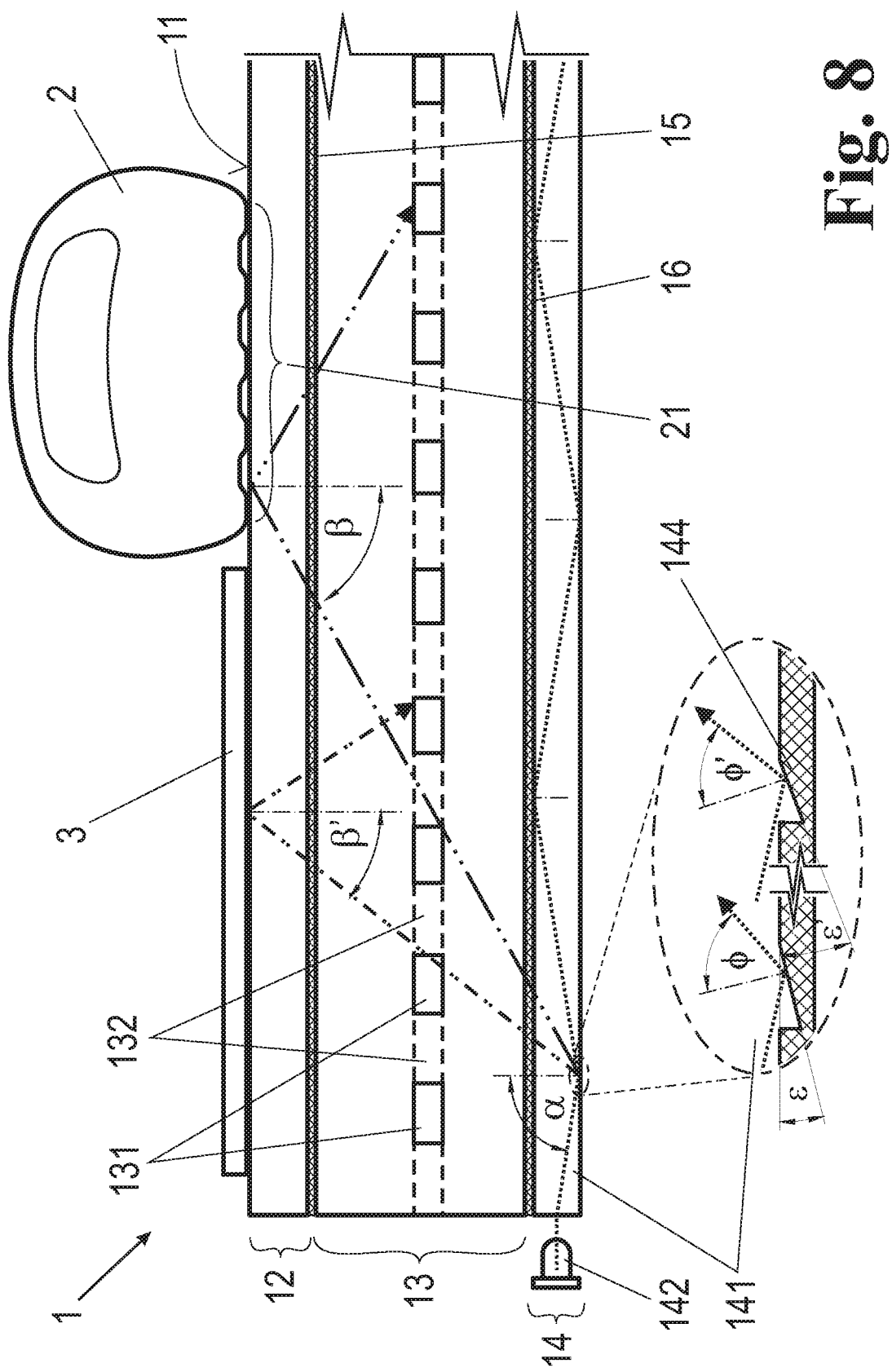
FIG. 8 shows a particularly advantageous embodiment form of the invention in which, as a result of light out-coupling structures with adapted inclination angles for TIR recordings of skin prints and adapted inclination angles for recording documents, it is possible to record both different types of objects.

A further preferred embodiment form without display 17 is shown in FIG. 8. The light guide layer 141 under the sensor layer 13 is formed in such a way that the illumination angle ß for illuminating a skin print 2 and illumination light with illumination angle ß' for illuminating documents 3 are proportionally coupled out of the light guide layer 141 in direction of placement surface 11. The components of light for illuminating documents 3 (illumination angle ß') couple out of the cover layer 12 toward the air, illuminate the document 3, and the light backscattered from the superposed document 3 is detected by the sensor layer 13. Since there is no optical coupling between the superposed document 3 and the placement surface 11, but rather a thin air layer always exists, the document 3 cannot be illuminated with light undergoing total internal reflection in the cover layer 12 with illumination angle ß.

When the device according to the invention has a display 17, the light emitted by the display 17 is utilized as illumination light for recording documents 3, since this light is coupled out of the cover layer 12 toward the air and no adaptation of light out-coupling structures 144 of the light guide layer 141 is required. When the device is operated as shown in FIG. 8, the illumination angle ß' for illuminating superposed documents 3 can be visually perceived additionally by the user of the device when using light in the visible region of the light spectrum. The lighting of the placement surface 11 can make it known, as simplified user guidance, when the device is ready to record skin prints 21 or documents 3 without a display 17 being required. The component of illumination light coupled out via the cover layer 12 toward the air should preferably be relatively small compared with the illumination light undergoing total reflection and should amount to less than 50% because this light component acts as contrast-reducing stray light during the recording of skin prints 21. In a preferred embodiment form, the light out-coupling structures 144 are formed such that between 50% and 95% of the illumination light coupled out of the light guide layer 141 are a light component which is totally reflected at the air interface at the placement surface 11 in the cover layer 12 and can be utilized to illuminate skin (illumination angle ß), while a remaining residual light component can be utilized for illumination angles to illuminate documents 3 (illumination angle ß').

If the vertical divergence at the light guiding angle α of the light guided in the light guide layer 141 is large enough, illumination angles β, β' are automatically coupled out in direction of cover layer 12 for illuminating skin prints 21 (illumination angle ß) and documents 3 (illumination angle β'). When cover layer 12 comprises a material with a refractive index of ~1.5 (for example, glass) and illumination angle β is 50° and has a divergence of +/−10°, illumination angles β' between 40° and 42° are coupled out into air and utilized to illuminate a superposed document 3.

This procedure can also be realized as shown in FIG. 8 by variously introduced inclination angles ε of the light out-coupling structures 144. Different inclination angles ε and ε' provide for different reflection angles φ and φ' at the corresponding light out-coupling structures 144 and result in different illumination angles β and β' at the placement surface 11. This makes it possible to directly control the components of illumination light for skin prints 21 and documents 3. FIG. 8 shows by way of example two different inclination angles ε and ε' in the enlarged detailed view of the light out-coupling structures 144 so that the reflection angles φ and φ' of the light out-coupling structures 144 and therefore the illumination angles β and β' vary, i.e., the two illumination states for skin prints 21 and for documents 3 can be generated from the same light guide layer 141. The different light out-coupling structures 144 can lie in mutually independent grids (not shown). For this purpose, in a preferred embodiment form, every tenth light out-coupling structure 144 is formed with an inclination angle ε' that realizes an illumination angle β' for illuminating documents 3 so that $_{90}$% of the coupled-out beam bundle still undergo total reflection with illumination angle β at placement surface 11 at the air interface and are used for illumination for recording skin prints 21.

In a further embodiment form, a first area of the placement surface 11 is provided only for recording documents 3 and is illuminated with illumination angles 13' from the light guide layer 141, and a second area of the placement surface 11 is provided exclusively for the recording of a skin print 2 and is illuminated with illumination angles 13 from the light guide layer 141, wherein the illumination light undergoes total reflection at the interface between cover layer 12 and air.

Accordingly, different objects, e.g., skin, documents, etc., can be recorded by selecting the configuration of the light out-coupling elements 144 of the light guide layer 141. In this way, it is also possible to adapt the structures to the different reflection behavior and scattering behavior of individual objects.

Figure 9A:
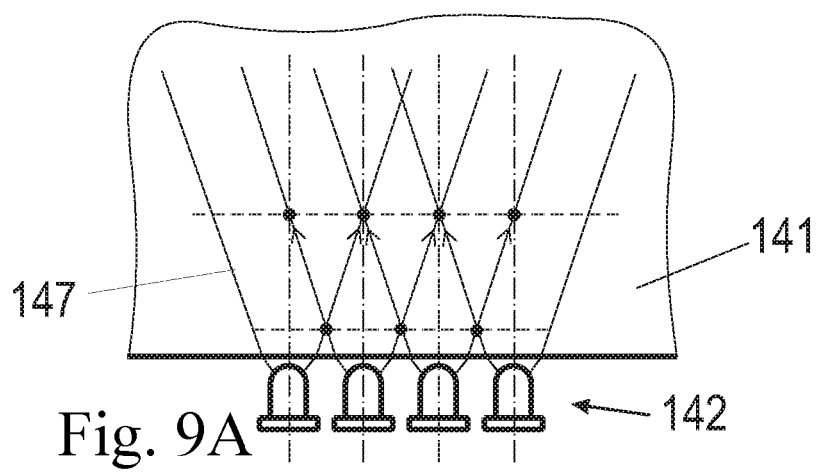
FIG. 9A shows an advantageous embodiment of the device according to the invention in which, at a narrow side of the light guide layer uncollimated LEDs are coupled in, wherein every object point generates a plurality of image points.

Various ways of coupling in illumination light at a narrow side of the light guide layer 141 by means of a plurality of LEDs 142 and light bundles thereof which are emitted with varying degrees of divergence are shown in FIG. 9A-E in five top views which differ with respect to the state of precollimation. It is assumed for these constructional variants that most of the LEDs 142 have already been precollimated in varying degrees by the manufacturer. FIG. 9A shows the coupling in of illumination light at a narrow side of the light guide layer 141 by means of a plurality of LEDs 142 and the clearly divergent beam bundles thereof in a top view.

Various embodiment forms can be used as source for the illumination light. If a plurality of LEDs is used without collimation of the beam bundles 147, the individual beam bundles 147 overlap and, as a result, an illuminated object point of a finger 2 placed on the placement surface 11 is illuminated by different beam bundles 147 and imaged (so as to be distributed) on a plurality of image points of the scanned image recording or on a plurality of points of the sensor layer 13 (not shown here). The possible imaging of an object point on a plurality of image points is indicated in FIG. 9A by the arrows.

As a result of the mixing of the beam bundles 147 of the plurality of light-emitting LEDs 142, it comes about in a compulsory manner that a plurality of image points is generated in the sensor layer 13 from an object point at the placement surface 11 so that the same object information of a superposed finger 2, for example, is detected on a plurality of light-sensitive elements 131 and the resolution of the imaged skin print 21 decreases. The smaller the horizontal and vertical divergence of the beam bundles 147, the higher the resolution. FIG. 9A schematically shows in a top view how an object point (shown in each instance as a black dot along the lower dashed line) is imaged respectively on two image points (as points along the second dashed line) at a distance from one another. This happens because there is a distance between placement surface 11 and sensor layer 13 as a result of the cover layer 12. The shorter this distance, the less broad the object information and the better the resolution. Thicknesses of from 50 μm to 1000 μm of the cover layer 12 are quite common. A large thickness of cover layer 12 ensures a better mechanical protection for the device and is therefore preferred. The smaller the divergence of the beam bundle 147, the better the resolution and the greater the thickness of cover layer 12 that can be selected with the same resolution. Therefore, means for collimating the beam bundles 147 of LEDs 142, as are shown in further subfigures of FIGS. 9A-E, are an approach to improving the resolution or increasing the thickness of cover layer 12.

Figure 9B:
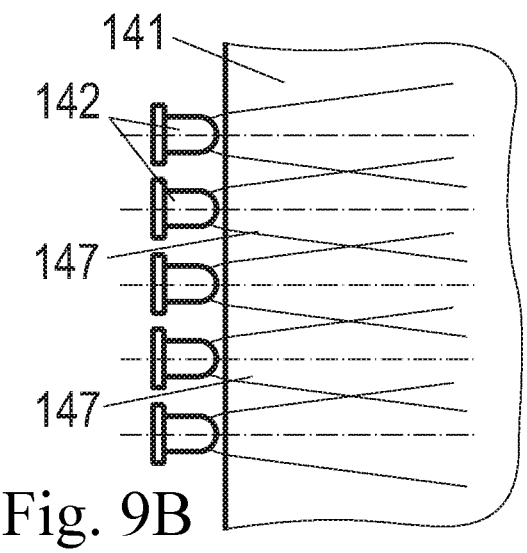

In FIG. 9B, LEDs 142 which are precollimated by the manufacturer are used and—as described above—they are arranged so as to be tightly packed relative to one another and at the shortest distance from the narrow side of the light guide layer 141 into which light is to be coupled. Accordingly, a reasonable divergence of the beam bundles 147 can be realized without additional precollimation optics 143 with a good mixing of the light components of the individual LEDs 142. Also, light refraction comes about at the interface between air and light guide layer 141 when the illumination light is coupled in, and a certain precollimation is achieved in this way.

Figure 9C:
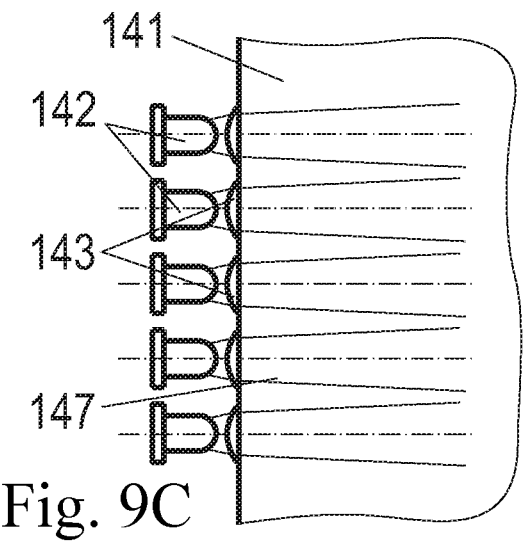
Figure 9D:
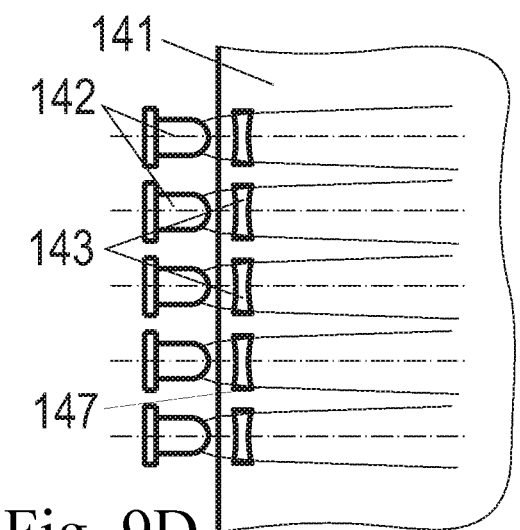
FIG. 9D shows LEDs which are beamed in at a narrow side of the light guide layer via precollimation optics embedded in the light guide layer.

In case this type of coupling in does not suit the requirements for the spatial resolution of the image recording, the constructional variants with additional precollimation optics 143 according to FIGS. 9C and 9D are preferred. In FIG. 9C, refractive convex lenses formed integral with the narrow side of the light guide layer 141 are selected as precollimation optics 143, for which GRIN lenses can also substitute. In FIG. 9D, the refractive precollimation optics 143 are incorporated into the material of the light guide layer 141 as concave lenses and are formed from an optically thinner medium, i.e., with an appreciably lower refractive index than the light guide layer 141. A gaseous medium such as air, for example, is best suited to this purpose. While the collimation state which can be achieved with embodiment examples according to FIGS. 9C and 9D ensures the best possible resolution, it has the disadvantage of an uneven intensity distribution of illumination of the placement surface 11 so that it is necessary to weigh these two configurations and the variant according to FIG. 9B against one another to determine which requirements should be given priority.

Figure 9E:
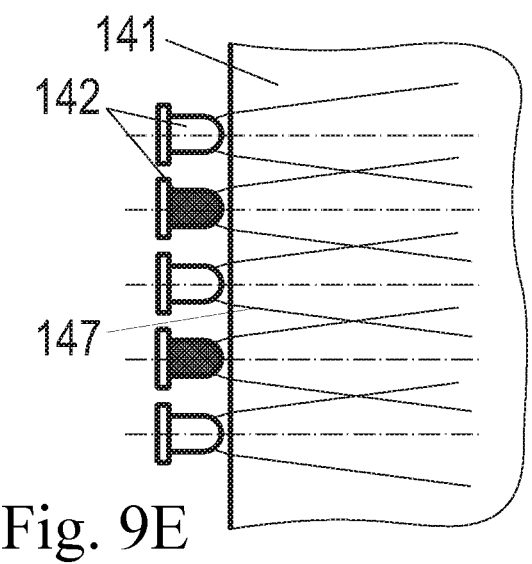
FIG. 9E shows LEDs of different wavelengths are alternately arranged for alternative spectral illumination.

In FIG. 9E, the tightly packed LEDs 142 are outfitted with different spectral emission wavelengths and are alternately arranged along the narrow side of the light guide layer 141 and are switchable. At least two different spectral regions are selected in order to record alternately illuminated images of the superposed objects, skin prints 2 or documents 3 which are preferably used for verifying authenticity.

Figure 10:
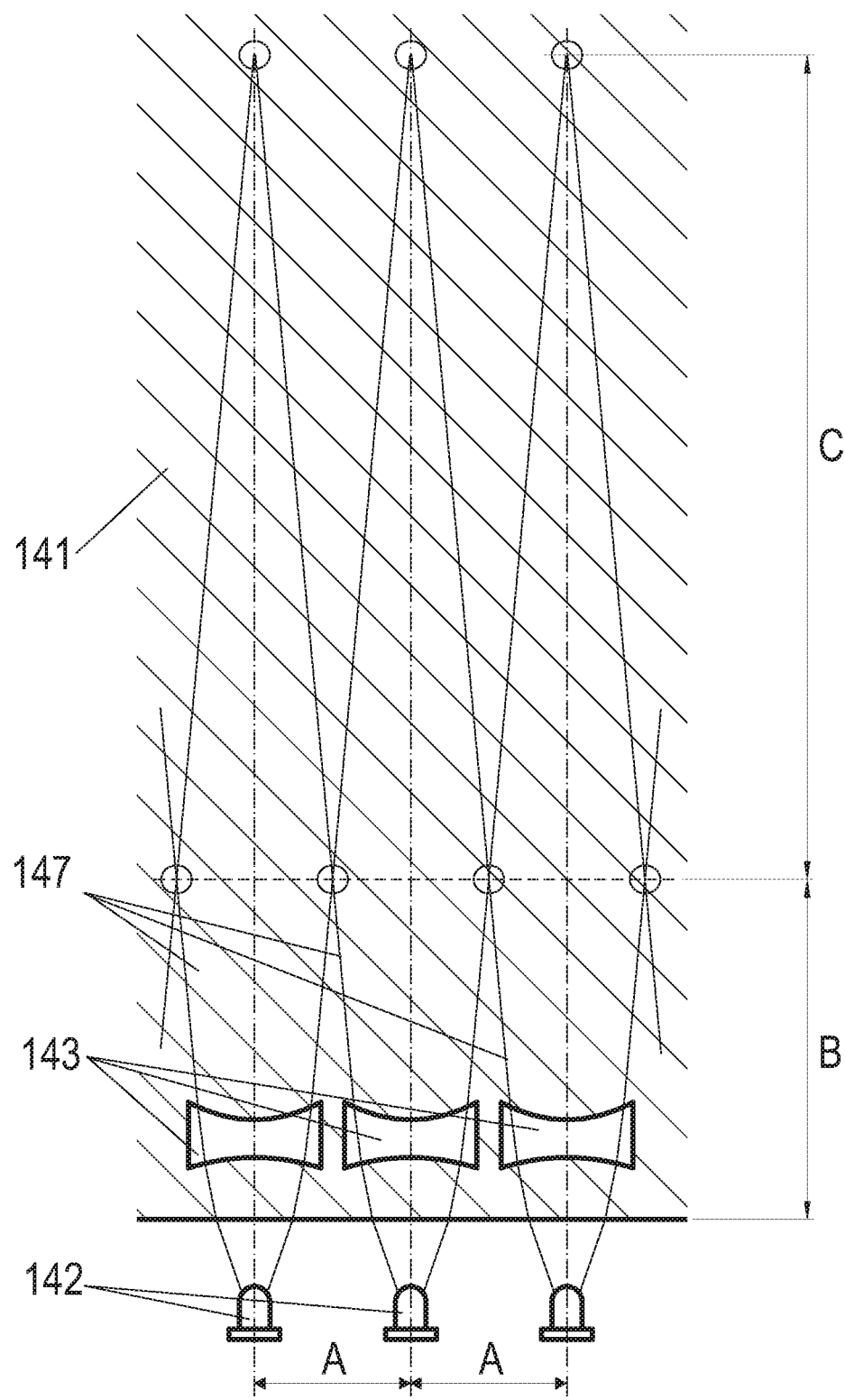
FIG. 10 is a depiction of tightly packed LEDs which are coupled in in a precollimated manner to illustrate the homogeneity of illumination that can be achieved depending on the mean spacing of LEDs and in-coupling lengths of the beam bundles.

FIG. 10 shows an embodiment form with an in-coupling of light at a narrow side of the light guide layer 141 and precollimation optics 143 in a top view.

It is advantageous that the beam bundles 147 of the plurality of LEDs 142 are sufficiently mixed before the illumination light of the plurality of LEDs 142 illuminates an object (finger 2 or document 3) placed on the placement surface 11 so that the placement surface 11 is uniformly illuminated. This is realized in a preferred embodiment form by means of coupling-in areas for the beam bundles 147, which coupling-in areas are upstream of the placement surface 11. For this purpose, a plurality of LEDs 142 which are arrayed close to one another with a minimum mean spacing A and with divergent beam bundles 147 are arranged at a narrow side of the light guide layer 141 according to FIG. 10 for coupling in light. The different beam bundles 147 are precollimated by means of respective precollimation optics 143 with the aim of reducing their divergence.

As was described earlier, a precollimation of LEDs 142 is helpful in order to realize a good resolution of the skin print 21.

A homogeneous illumination is realized in that precollimated LEDs 142 are packed as close as possible to one another and, as is shown in FIG. 10, have a first coupling-in length B or even a second coupling-in length C for sufficient mixing in order to prevent light intensity spikes and consequent local overexposure of skin prints 21.

The coupled-in adjacent divergent beam bundles 147 accordingly overlap particularly in horizontal direction only after the first coupling-in length B at the points marked by circles. Consequently, there is a better distribution of light in the next area of the light guide layer 141. The beam bundles 147 of the second neighborhood of LEDs 142 overlap after the second coupling-in length C so that a virtually perfect homogenization of the illumination is realized.

The smaller the divergence of the LEDs 142, the better the resolution of the skin print 21 because local object information is imaged on fewer image points (distributed and mixed). However, if the beam bundles 147 are limited (collimated) too much, the placement surface 11 is illuminated unevenly or, in the extreme case, is not illuminated at all in some places. In this case, a sufficiently large coupling-in length B or B+C is necessary, and this is dependent on the mean distance A between two adjacent LEDs 142 and on the degree to which they are precollimated. Under normal circumstances, a coupling-in length B or B+C of several millimeters, preferably between 2 mm and 20 mm, is sufficient to realize a sufficient overlapping and mixing of the beam bundles 147.

With a divergence of 10° and a distance of 10 mm as mean spacing A of the LEDs 142, a coupling-in length B of 57 mm is required so that the emitted beam bundles of the adjacent LEDs overlap (tan 85°=A/5). In order to satisfy stricter requirements respecting homogeneity, full width at half maxima (FWHM) of the LEDs 142 after next should also overlap before their light impinges on a superposed skin print 21. For this purpose, the coupling-in length would have to be 114 mm (tan 85%=A/10). This also shows that the LEDs 142 are preferably arranged as tightly as possible, i.e., the mean spacing A of the LEDs 142 is as small as possible, especially when the light cone is sharply limited by the precollimation optics 143, i.e., when the FWHM is small.

Figure 11A:
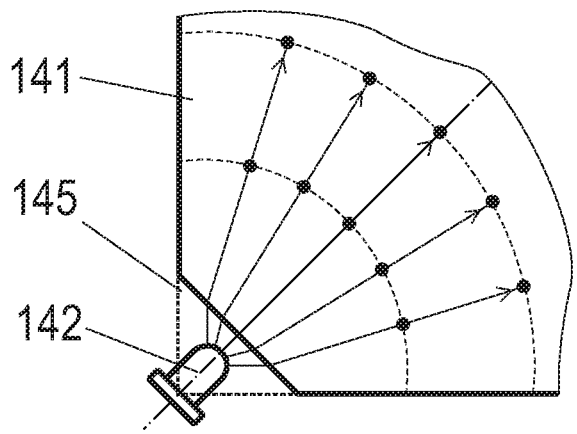
FIG. 11A shows an advantageous embodiment of the coupling of light into the light guide layer of the device according to the invention in which, at a cut corner of the light guide layer, a corner illumination is realized with an uncollimated LED, wherein every object point (in horizontal direction) generates exactly one image point.
Figure 11B:
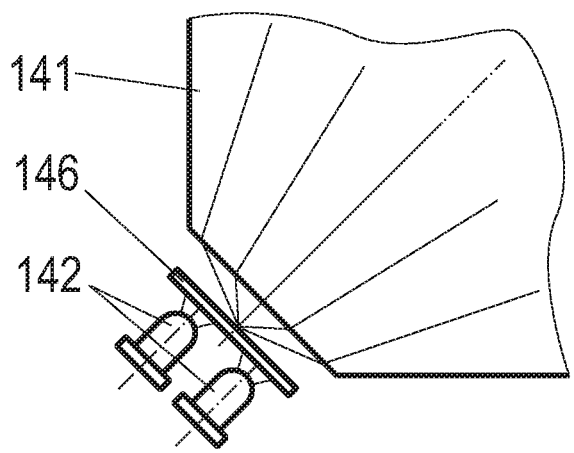
FIG. 11B shows a further embodiment for coupling light into the light guide layer at a corner by applying two LEDs with diffuser arranged therebetween.
Figure 11C:
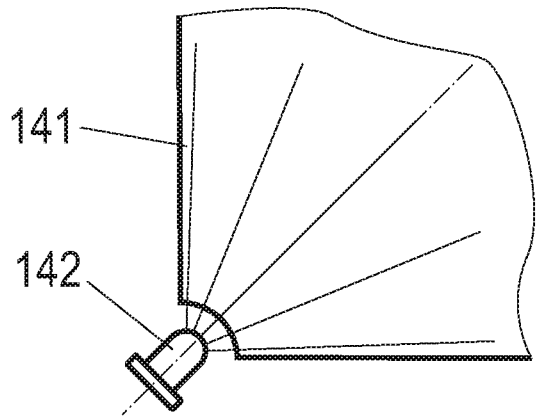
FIG. 11C shows still another embodiment for coupling light into the light guide layer at a corner by applying an uncollimated LED, wherein the cut corner of the light guide layer has an in-coupling surface which is curved in an adapted manner.

FIGS. 11A-11C show three top views of further constructional details of the device according to the invention with a so-called corner light coupling-in with at least one LED.

FIG. 11A shows an embodiment form for coupling the light of an LED 142 into the light guide layer 141 in a top view in which the coupling-in of light through an LED 142 is implemented at a cutting of at least one corner of the light guide layer 141. An additional, very short narrow side of the light guide layer 141 having an angle of 135° with the narrow sides typically present in a rectangular light guide layer 141 is produced by a cut corner 145. This embodiment form has the advantage that no collimation of the beam bundle 147 of LED 142 is necessary in horizontal direction by precollimation optics 143 (as is shown in FIGS. 9C and 9D). LED 142 should preferably emit into the light guide layer 141 at an angle of +/−45° to the adjacent right-angled narrow edges. In so doing, every object point generates only one discrete image point in horizontal direction as is shown by the black dots in FIG. 11A because there is no overlapping of different beam bundles (as is illustrated FIG. 11A in contrast to FIG. 9A). A reduction in resolution takes place only through the vertical divergence (not shown) which, however, as already described above, can be sharply limited owing to the small differences in the refractive indices between light guide layer 141 and adjacent adhesion layers 16 and 18 and the inclination angle c of the light out-coupling structures 144, and even divergences of less than +/−5° can be realized. The drop in intensity of the divergent beam bundle 147 coupled into the light guide layer 141 can be compensated by an increasing fill factor of the light out-coupling structures 144 (from size and density of the light-out coupling structures 144) toward the edge. The shape, size and density distribution of the light-out coupling structures 144 can be realized as shown in FIG. 3C and can be constructed as preferably trapezoidal surface elements ascending in a monopitch roof-shaped manner.

With a corner illumination provided in this way, reflections at the edge areas of the adjacent narrow sides of the light guide layer 141 can be disadvantageous because they can result in double images and in impaired resolution. Therefore, a preferred construction consists in that the light guide layer 141 has absorbent coatings at the further narrow sides at which no light is coupled in, which absorbent coatings absorb or couple out light impinging on these further narrow sides.

Further measures in addition to those in FIG. 11A are shown in FIGS. 11B and 11C. FIG. 11B shows a multiple arrangement of LEDs 142 in which the light distribution or light homogenization of the two LEDs 142 provided in this example is improved by a diffuser 146 through which light is uniformly (diffusely) emitted in all directions. FIG. 11C shows an exemplary shape for the cut corner 145 which is constructed as a concave curve so that all of the rays exiting divergently from the LEDs 142 can enter the light guide layer 141 without discontinuity so that light source light can propagate in the entire light guide layer 141 in a uniformly distributed manner and be coupled out of the latter.

It is possible with the embodiment forms of the invention described herein to make high-resolution, high-contrast recordings of skin prints 21 and also documents which are based on a selective coupling out of light from a light guide layer 141 at defined angles for total internal reflection (TIR) or for light output for document illumination. Further, diaphragm structures are associated with the individual sensor elements 131 as diaphragm layer 133 in the sensor layer 13, and these diaphragm structures allow exclusively the TIR angle ranges coupled out of the light guide layer 141 in a defined manner to be detected. Further optimization of image recordings of skin prints 21 and security-relevant documents 3 can be achieved by additional measures of sensor control for adjusting electronic shutter functions (rolling shutter or global shutter).

REFERENCE CHARACTERS 1 layer body
11 placement surface
12 cover layer
13 sensor layer
131 light-sensitive elements
132 transparent areas
14 light source unit
141 light guide layer
141' (further) light guide layer
142 LED
143 precollimation optics
144 light out-coupling structure
145 cut corner
146 diffuser
147 beam bundle
15 first adhesion layer
16 second adhesion layer
17 display
171 terminating layer
172 substrate
173 luminous element layer
18 further adhesion layer
19 spectral filter layer (bandpass)
2 finger
21 skin print (to be recorded)
3 document 4 stray light
α light guiding angle (of the light guided in the light guide layer)
β, β' illumination angle (at the placement surface)
δ exit angle (from the light guide layer)
ε, ε' inclination angle (of the light out-coupling structure)
φ, φ' reflection angle (of the light out-coupling structure)
γ refraction angle (of the light out-coupling structure)

What is claimed is:

1. A device for direct optical recording of skin prints, the device comprising:
    a layer body comprising a placement surface formed by a cover layer of the layer body;
    a sensor layer having light-sensitive elements arranged in a sensor grid and transparent areas;
    a light source unit formed as a light guide layer and arranged below the sensor layer;
    the light guide layer having at least one LED for coupling in of light at a narrow side and being provided with light out-coupling structures permitting directed coupling out of light from the light guide layer at a defined angle based on an inclination angle of the light out-coupling structures and on differences in refractive indices between the neighboring layers of the light guide layer up to the cover layer;
    the light out-coupling structures having an inclination angle coupling light out from the light guide layer at the defined angle in such a manner that the out-coupled light, after having passed through all layers up to the cover layer, undergoes a total internal reflection (TIR) at an air interface of the placement surface and has a divergence angle range of ≤+/−15°; and
    a first adhesion layer between the cover layer and the sensor layer and a second adhesion layer between the sensor layer and the light guide layer, wherein the second adhesion layer has a refractive index which is at least 1% lower and at most 30% lower than refractive indices of the light guide layer and of the sensor layer which are between 1.45 and 1.8, and wherein the first adhesion layer has a refractive index which is at least as high as that of the second adhesion layer.

2. The device according to claim 1, wherein the LED light in-coupling has precollimation optics at the narrow side of the light guide layer, the precollimation optics being arranged downstream of the at least one LED and serving to adjust a horizontal divergence between 2.5° and 30° in a beam bundle coupled into the light guide layer.

3. The device according to claim 2, wherein the precollimation optics is a refractive optical element which is incorporated at the narrow side of the light guide layer.

4. The device according to claim 3, wherein the precollimation optics is a convex lens or a GRIN lens incorporated at the narrow side of the light guide layer of.

5. The device according to claim 3, wherein the precollimation optics is a concave lens of a medium with a lower refractive index than that of the light guide layer formed inside the light guide layer.

6. The device according to claim 2, wherein a plurality of closely adjacent LEDs is arranged along a narrow side of the light guide layer to bring about an adjusted light intensity in the light guide layer after a defined coupling-in length depending on the horizontal divergence of the beam bundles of the LEDs in the light guide layer.

7. The device according to claim 1, wherein the light guide layer has a cut corner to provide a corner coupling-in of light with at the least one LED arranged at least at one narrow side, and wherein a drop in intensity of a divergent beam bundle coupled into the light guide layer is compensated by an increasing fill factor of a magnitude and density of the light out-coupling structures.

8. The device according to claim 7, further comprising a diffuser arranged between the at least one LED and the narrow side of the cut corner of the light guide layer for uniform distribution of the coupled-in light in all solid angles.

9. The device according to claim 1, wherein the refractive index of the first adhesion layer is the same as the refractive index of the second adhesion layer so that a component of stray light exiting from the skin areas placed on the placement surface is totally internally reflected within the cover layer and is prevented from propagating to the sensor layer.

10. The device according to claim 1, wherein the layer body comprises a display arranged under the light guide for displaying user information.

11. The device according to claim 10, wherein the display is fastened to an underside of the light guide layer either removably or with a further low-refracting adhesion layer having a refractive index at least as high as that of the second adhesion layer.

12. The device according to claim 1, wherein the light out-coupling structures are formed such that only between 50% and 95% of illumination light coupled out of the light guide layer at the air interface at the placement surface is a light component totally internally reflected in the cover layer and a remaining residual light component can be utilized for illuminating documents.

13. The device according to claim 1, wherein a fill factor of the light out-coupling structures formed by the magnitude and spacing of the light out-coupling structures is at least large enough for each location on the light guide layer that the light out-coupling structures are not visible in a print image of skin areas to be recorded.

14. The device according to claim 13, wherein the light out-coupling structures have a spacing s smaller than a resulting beam divergence of the light out-coupling structures of the light guide layer.

15. The device according to claim 1, comprising a further light guide layer arranged under light guide layer and is connected to transparent light guide layer by a further adhesion layer having a refractive index similar to the first adhesion layer and second adhesion layer.

16. The device according to claim 15, wherein the light guide layer and the further light guide layer have the light in-coupling on opposite narrow sides of the layer body.

17. The device according to claim 15, wherein the light guide layer and the further light guide layer have the light in-coupling at the same narrow side of the layer body and have the light out-coupling structures with the same orientation, and wherein the light guide layer and further light guide layer can have the light out-coupling structures with inclination angles c that differ from one another to the extent that these differing inclination angles respectively generate illumination angles β which result in total reflection at the placement surface.

* * * * *